No. 749,734. PATENTED JAN. 19, 1904.
H. H. HUGHES.
MEANS FOR PREVENTING SMOKE.
APPLICATION FILED JUNE 29, 1903.
NO MODEL. 4 SHEETS—SHEET 2.

No. 749,734. PATENTED JAN. 19, 1904.
H. H. HUGHES.
MEANS FOR PREVENTING SMOKE.
APPLICATION FILED JUNE 29, 1903.
NO MODEL. 4 SHEETS—SHEET 3.

No. 749,734. PATENTED JAN. 19, 1904.
H. H. HUGHES.
MEANS FOR PREVENTING SMOKE.
APPLICATION FILED JUNE 29, 1903.
NO MODEL. 4 SHEETS—SHEET 4.
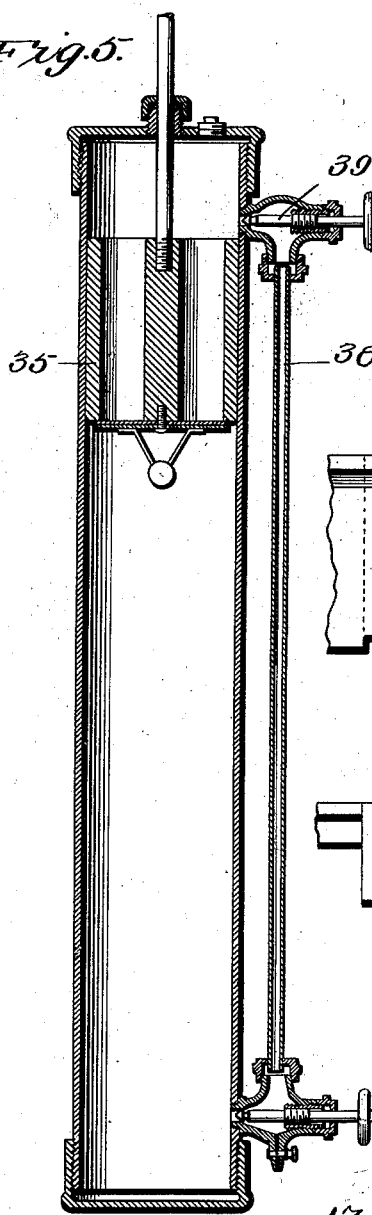
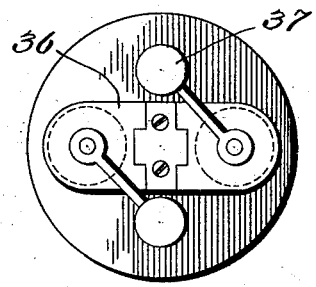
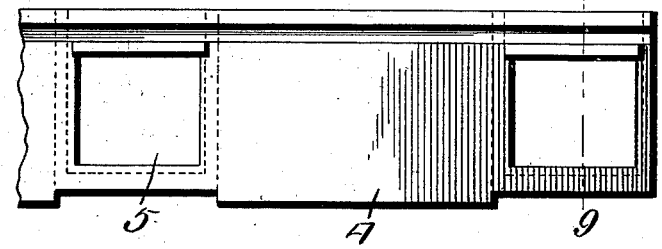
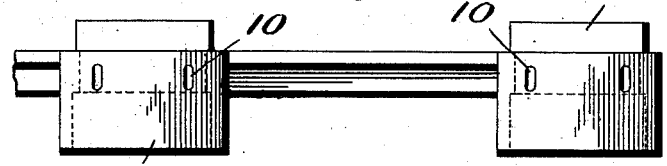
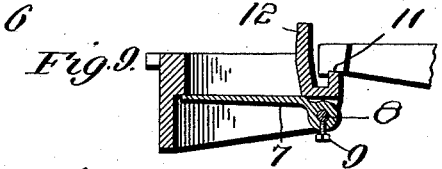
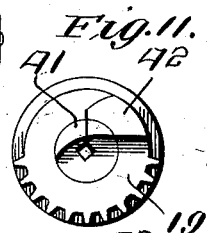
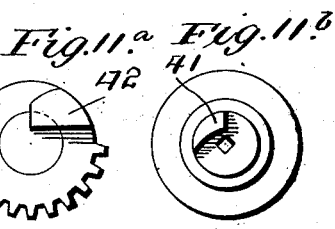
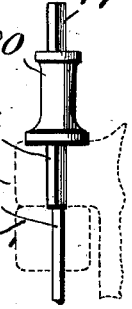
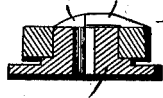
WITNESSES: INVENTOR
Sue G. Jordan Herbert H. Hughes
Maud E. Letcher BY Hugh K. Wagner
His Attorney
THE NORRIS PETERS CO., PHOTO-LITHO., WASHINGTON, D. C.

No. 749,734. Patented January 19, 1904.

UNITED STATES PATENT OFFICE.

HERBERT HENRY HUGHES, OF ST. LOUIS, MISSOURI.

MEANS FOR PREVENTING SMOKE.

SPECIFICATION forming part of Letters Patent No. 749,734, dated January 19, 1904.

Application filed June 29, 1903. Serial No. 163,473. (No model.)

*To all whom it may concern:*

Be it known that I, HERBERT HENRY HUGHES, a citizen of the United States, residing in the city of St. Louis and State of Missouri, have invented certain new and useful Improvements in Means for Preventing Smoke, of which the following is a specification.

My invention relates to improvements in furnaces of all types, but more particularly to furnaces embodying steam-boilers; and the primary object thereof is to effect a perfect combustion of the fuel in the furnace, thereby preventing smoke.

A further object of the invention is to provide means for automatically regulating the feeding of oxygen to a point above the fire-grate when a charge of coal is thrown into the fire, thus relieving the fireman from considerable care. These results are obtained through the admission of air to the furnace at the time of firing and as long thereafter as may be necessary, after which the supply is gradually cut off, thus preventing an unnecessary amount of air entering the furnace except by its natural course—*i. e.*, through the grate-bars.

Further objects and advantages will be set forth in the following description and claims.

Figure 1:
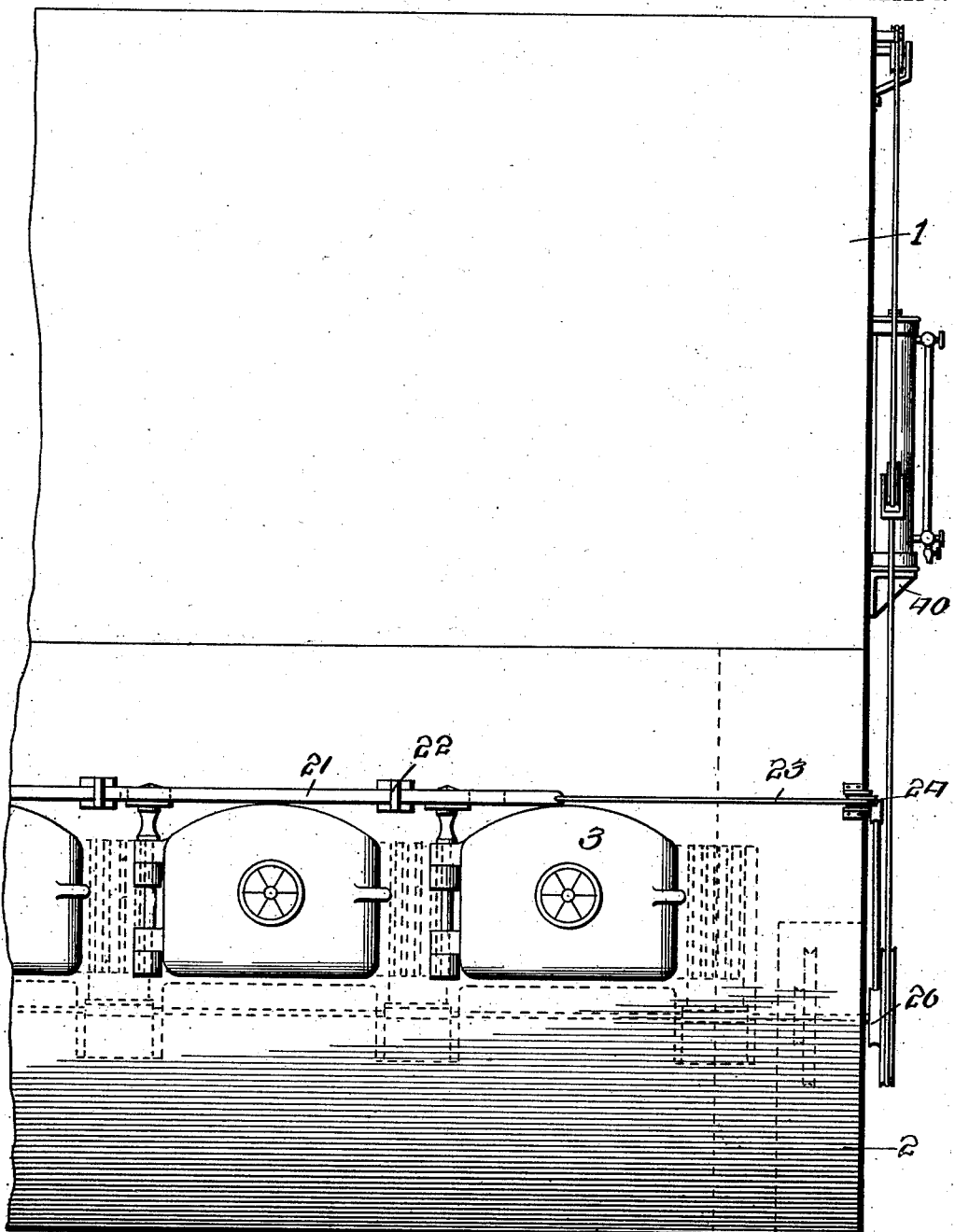
Figure 2:
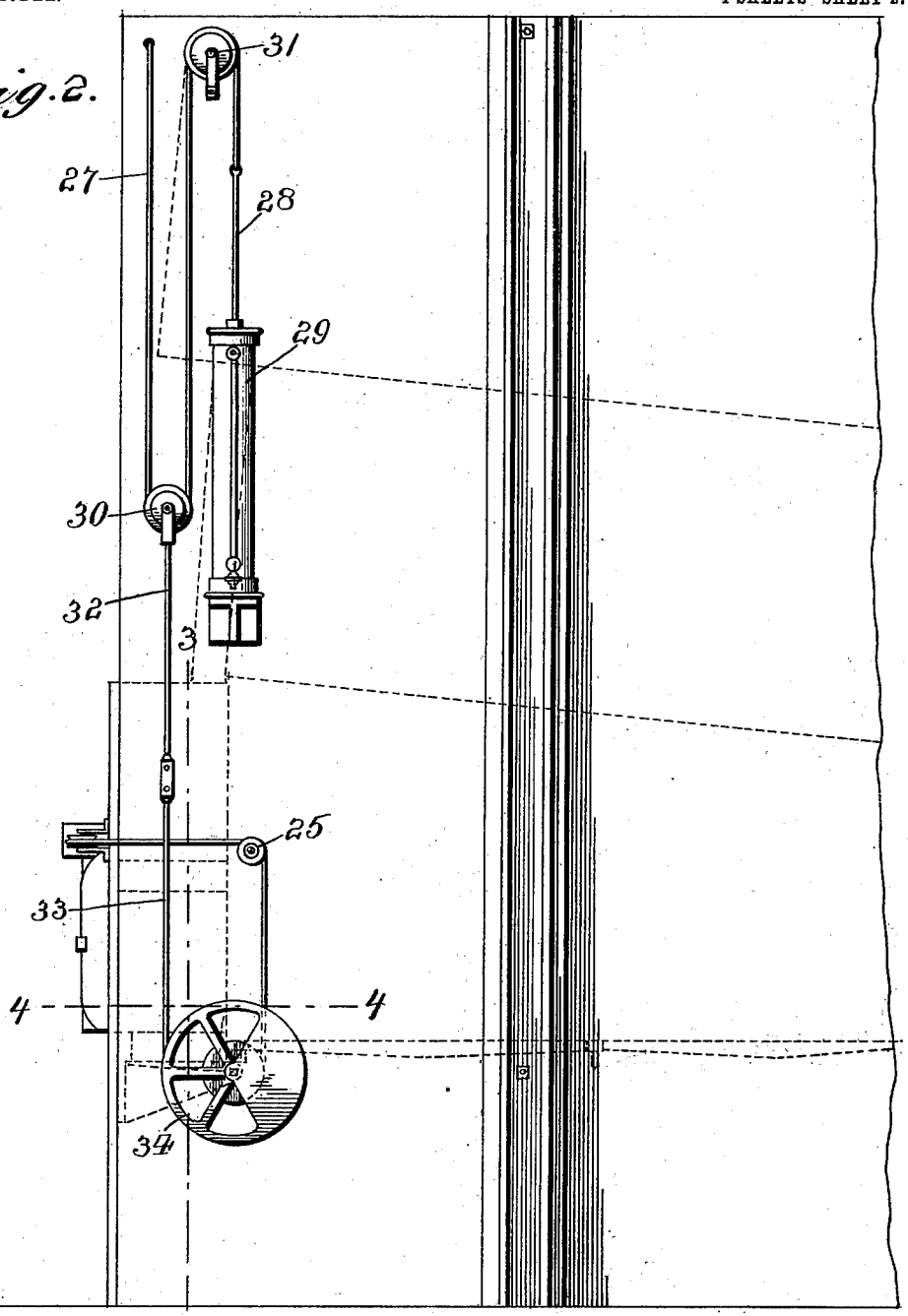
Figure 3:
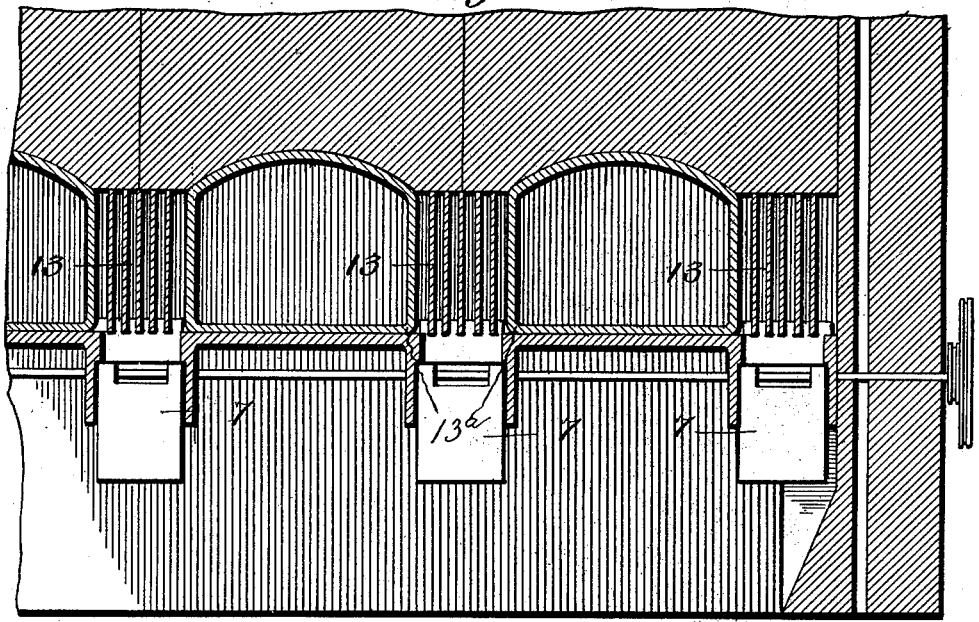
Figure 4:
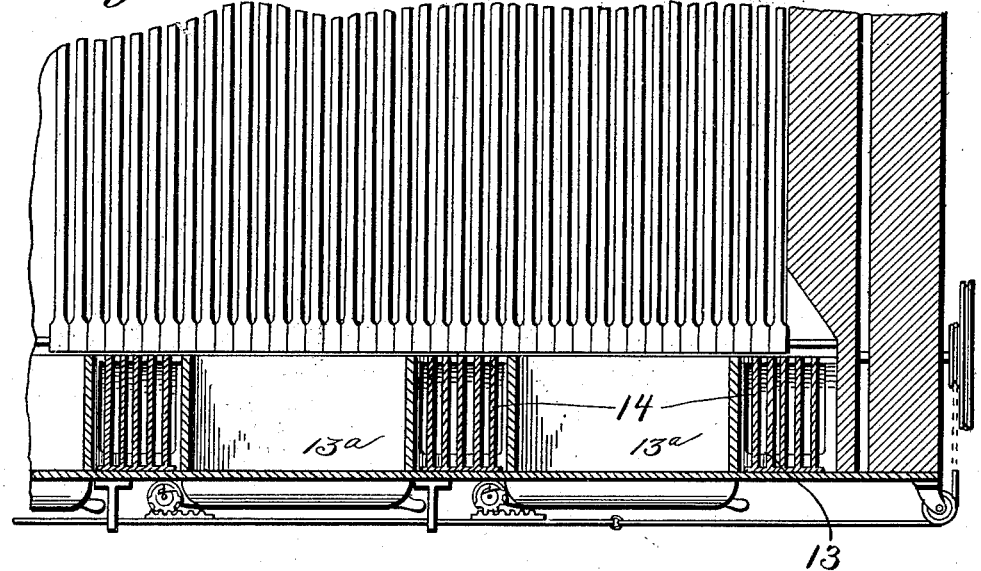

In the accompanying drawings, in which like reference-numerals are employed to indicate like parts throughout the several views, Figure 1 is a fragmentary view, in front elevation, showing the general construction of the entire apparatus. Fig. 2 is a side elevation thereof. Fig. 3 is a vertical cross-sectional view taken on line 3 3 of Fig. 2. Fig. 4 is a horizontal cross-sectional view taken on line 4 4 of Fig. 2. Fig. 5 is a vertical sectional view of the dash-pot, showing the arrangement of the by-pass thereof and the construction of the piston. Fig. 6 is a bottom plan view of the piston. Fig. 7 is a fragmentary top plan view of the dead-plate, illustrating the damper-openings. Fig. 8 is a front elevation thereof. Fig. 9 is a cross-section taken on line 9 9 of Fig. 7 and illustrating the position of the grate-bars in relation thereto. Fig. 10 is a view in side elevation of one of the pivot-pins of the hinges of the furnace-doors. Figs. 11, 11$^a$, and 11$^b$ are detail views, in top plan, of the coöperating means carried by the pin, illustrating the pin shown in Fig. 10; and Fig. 12 is a vertical sectional view thereof.

1 represents a furnace of the ordinary steam-boiler type, the same being diagrammatically illustrated as a whole, inasmuch as in connection with my improvement it will be readily apparent that a detailed illustration of the entire furnace is unnecessary. I have therefore shown and will in the following refer to those portions of the furnace construction which coöperate or assist with the present invention in the carrying out of the objects thereof.

2 indicates the removable front plate of the furnace, the same being provided with openings for the feeding of fuel to the fire, and 3 the doors thereof.

4 indicates the dead-plate, provided at points in the rear of and between the doors 3 with openings 5, surrounded by depending frame 6, in which the dampers 7 are hinged. These dampers are all rigidly secured to the longitudinally-extending shaft 8 by suitable means, and as illustrating a simple manner I have shown set-screws 9. This, however, is not absolutely essential, inasmuch as any well-known fastening means can be employed.

The dead-plate 4 is attached to the front plate 2 of the furnace by means of bolts which pass through the slots 10 thereof. At the inner end edge of the dead-plate I provide the upturned flange 11, which is engaged by the grate-bars, which holds the same against displacement, and in order to prevent hot coals or clinkers from falling from the fire-bed through the openings of the dead-plate I arrange directly in the rear of each of the said openings a guard 12. These guards lie approximately parallel with the flanges 11; but, as will be apparent by reference to Fig. 8, they extend considerably above the same.

In the front wall of the furnace between the fuel-opening frames 13$^a$ chambers or spaces are formed, and in these chambers or spaces are placed the superheating air-boxes 13, which are preferably left loose for the purposes of expansion and contraction. By being thus placed, as illustrated in Figs. 2 and 3, they tend to distribute the air admitted to the furnace through the openings 5 of the dead-plate over the entire fire-surface. The object of this box, which as heretofore stated is arranged in alinement with the openings 5 on top of the dead-plate, is to superheat the air as it passes into the furnace and to support the furnace-wall above the same. This box does not have to be of any specific dimensions and its width can be changed by leaving off a rib or by adding one or several, according to the size of the openings desired. The ribs are indicated by the reference-numeral 14, and are so connected as to produce a closed forward end, whereby the heat when passing therethrough will be directed directly to the interior of the furnace. The boxes perform yet another function by so separating the air as it passes therethrough that it will more thoroughly unite or commingle with the gases than when admitted in one large volume.

The pivot-pins 15 of the doors are provided with the intermediate squared portions 16, which engage angular apertures in the lugs of the respective doors, and also have their upper ends provided with similar portions 17, on which the removable members 18 are received, said members carrying the toothed wheels 19 for purposes hereinafter described. In order to prevent the members 18 from moving downwardly beyond their normal position, I provide each pivot-pin with a spool-shaped portion 20, which has its opposite ends bearing on the upper face of the aforementioned lugs and the members 18, respectively. By this construction it will be observed that I provide means whereby as the respective wheels 19 are rotated movement will also be given to pivot-pins, and thus the doors swung, and in order that all these pivot-pins can be simultaneously rotated I provide a rack-bar 21, slidably mounted in brackets 22, carried by the front plate of the furnace, and having its teeth engaging the teeth of the respective wheels. To the one end of this bar I attach a cable 23, the same passing over the sheaves 24 and 25, respectively, and engaging the pulley 26, mounted on the end of the shaft 8. 27 indicates another cable which has one of its ends secured to the furnace-body and its opposite end connected to the plunger 28 of the dash-pot 29 and having its intermediate point looped by passing over the pulleys 30 and 31, respectively, the latter of which is fixedly mounted and the former connected to the rod 32, which is in turn connected with the cable 33, passing over the large pulley or wheel 34, mounted on the shaft 8 beside the pulley 26.

35 indicates the plunger or piston mounted within the dash-pot and being connected with the piston-rod 28, the same being formed with a pair of vertically-extending openings which are closed by the flap-valves 36. These flap-valves are preferably formed of brass, although other materials can be employed, and are counterbalanced by small Babbitt balls 37.

In operation when it is desired to fire the furnace upon the opening of the door the rod 21 will be slid or moved so as to pull the cable 23, which will impart a partial rotation to the pulley 26, and thus operate the shaft 8, and consequently open the dampers 7. Further, as the shaft 8 is rotated the pulley 34 will also be moved, so as to move the cable 27 and elevate the dash-pot. The dampers are closed automatically by the weight of the piston 35 in the dash-pot, and the speed at which the dampers 7 are closed is regulated by the by-pass 38, carrying the valves 39. The liquid with which I fill the dash-pot is preferably glycerin and alcohol. The dash-pot is preferably supported on a bracket 40.

In view of the foregoing it will be seen that I have provided an improvement which while embodying a very simple construction gives a very practical one, and, further, one in which injured parts can be readily replaced. It will further be noted that when the furnace-doors are closed the ribs of the superheating-chambers will be heated, so that when the dampers 7 are open the air on being brought into proximity therewith will be heated.

In the detail views shown in Figs. $11^a$ and $11^b$ I have shown the simple means for locking the gear-wheels of the pivot-pins to the members 18, the same comprising lugs 41 and 42, carried by the respective parts.

While in the foregoing I have illustrated and described a construction which in my opinion embodies parts constructed to carry on in a successful manner the work assigned to them, yet it will be obvious that I do not desire to restrict myself to such, inasmuch as I am well aware of the fact that mechanical equivalents can be readily substituted, and I therefore reserve the right to make such alterations and changes as fall within the scope of the appended claims.

Having thus fully described my invention, what I claim, and desire to secure by Letters Patent, is—

1. In a furnace of the type set forth, a dead-plate, having its inner edge provided with an upturned flange, and being formed with openings in front thereof, and integral guards arranged between said openings and flange.

2. In a furnace of the type set forth, an air-superheating box formed of a plurality of spaced-apart ribs connected to an end wall, the remaining sides and end of the box being open.

3. In a furnace the combination with the doors, and the pivot-pins thereof, removable members mounted on the upper ends of said pins, toothed wheels carried by said members, coöperating lugs carried by said members, and wheels respectively, a slidably-mounted toothed bar engaging said wheels, means for controlling the air-feed to the interior of the furnace, and means actuated by said bar for controlling said last-named means.

4. In a furnace, the combination with the doors and the dead-plate formed with openings, of dampers for closing said openings, a shaft to which all of said dampers are secured, a wheel on the outer end of said shaft, a pulley mounted on said shaft, toothed wheels mounted on the pivot-pins of said doors, a slidable toothed bar engaging said toothed wheels, a flexible connection between said pulley and bar, a dash-pot having a plunger, and a flexible connection passing over said first-named wheel and being connected to the plunger of the dash-pot.

In testimony whereof I have affixed my signature, in presence of two witnesses, this 26th day of June, 1903.

HERBERT HENRY HUGHES.

Witnesses:
MAUD E. LETCHER,
SUE G. JORDAN.